US010622598B2

(12) United States Patent
Christensen

(10) Patent No.: US 10,622,598 B2
(45) Date of Patent: Apr. 14, 2020

(54) VARIABLE BATTERY SYSTEM FOR FLASHLIGHTS

(71) Applicant: Simple Products Corporation, Draper, UT (US)

(72) Inventor: Brian Christensen, Draper, UT (US)

(73) Assignee: Simple Products Corporation, Draper, UT (US)

( * ) Notice: Subject to any disclaimer, the term of this patent is extended or adjusted under 35 U.S.C. 154(b) by 211 days.

(21) Appl. No.: 14/874,167

(22) Filed: Oct. 2, 2015

(65) Prior Publication Data

US 2017/0098804 A1    Apr. 6, 2017

(51) Int. Cl.
*H01M 2/10* (2006.01)
*H01M 2/20* (2006.01)
*H02J 7/00* (2006.01)

(52) U.S. Cl.
CPC ......... *H01M 2/1055* (2013.01); *H01M 2/204* (2013.01); *H01M 2220/30* (2013.01); *H02J 7/0042* (2013.01)

(58) Field of Classification Search
CPC .............. H01M 2/1055; H01M 2/204; H01M 2230/30; H01J 7/0042
See application file for complete search history.

(56) References Cited

U.S. PATENT DOCUMENTS 2,166,657 A * 7/1939 Evelyn .................... F21L 15/10
                                                     362/194
5,167,447 A    12/1992 Gonzales
(Continued)

FOREIGN PATENT DOCUMENTS

CN         201803271 U    4/2011
WO    WO 2013/139793 A2    9/2013

OTHER PUBLICATIONS

Electronics Newsweekly, "Mag Instrument, Inc.; Agency Reviews patent Application Approval Request for 'Multi-Mode Portable Lighting Device'", Electronics Newsweekly, Oct. 24, 2012; 3 pages, 4770, NewsRx, Atlanta GA.

(Continued)

*Primary Examiner* — Jonathan G Leong
*Assistant Examiner* — Aaron J Greso
(74) *Attorney, Agent, or Firm* — Thorpe North & Western, LLP

(57) ABSTRACT

A battery compartment can include a primary battery slot, at least one optional intermediate battery slot, a terminal battery slot, and a bypass switch. More specifically, the primary battery slot can retain a first battery and can have primary positive and negative leads oriented to contact corresponding positive and negative terminals of the first battery. The optional intermediate battery slot can retain a second battery and can have intermediate positive and negative leads oriented to contact positive and negative terminals of the second battery. The terminal battery slot can retain a third battery and can have terminal positive and negative leads oriented to contact positive and negative terminals of the third battery. The battery slots can be connected in series with the intermediate battery slot oriented between the primary and terminal slots. At least one bypass switch can be coupled to one or both of the leads of at least one of the battery slots. The switch can also be adapted to create an electrical path to a subsequent battery slot when the battery slot corresponding to the switch is empty.

18 Claims, 5 Drawing Sheets

(56) References Cited

U.S. PATENT DOCUMENTS

| | | | |
|---|---|---|---|
| 6,038,473 | A | 3/2000 | Olson et al. |
| 6,268,711 | B1 * | 7/2001 | Bearfield ............. H02J 7/0024 |
| | | | 320/116 |
| 6,851,828 | B1 | 2/2005 | Hansen |
| 7,342,360 | B2 | 3/2008 | Van Deursen et al. |
| 7,824,796 | B1 | 11/2010 | Bode |
| 7,896,519 | B2 | 3/2011 | Maglica |
| 7,909,478 | B2 | 3/2011 | Dallas |
| 8,274,273 | B2 | 9/2012 | Jones |
| 2002/0036480 | A1 | 3/2002 | O'Neill et al. |
| 2002/0114982 | A1 | 8/2002 | Putt et al. |
| 2007/0030673 | A1 * | 2/2007 | Hull ....................... F21L 4/005 |
| | | | 362/208 |
| 2007/0178777 | A1 * | 8/2007 | Miekka ................. H01R 13/02 |
| | | | 439/886 |
| 2007/0210745 | A1 | 9/2007 | Dingeldein |
| 2008/0292947 | A1 * | 11/2008 | Scherrer .............. H01M 2/204 |
| | | | 429/97 |
| 2013/0200848 | A1 | 8/2013 | Ozawa et al. |
| 2014/0177213 | A1 | 6/2014 | Lam |

OTHER PUBLICATIONS

Journal of Ingineering, "Sanyo Electric Co., Ltd.; Patent Issued for Battery Charger with Charging Status Indicator in Battery Compartment," Journal of Engineering, Aug. 29, 2012; 3 pages, 2739, NewsRx, Atlanta GA.

* cited by examiner

VARIABLE BATTERY SYSTEM FOR FLASHLIGHTS

RELATED APPLICATION(S)

None.

FIELD OF THE INVENTION

The present invention relates to battery systems usable in a battery-powered device, such as a flashlight. Accordingly, the invention relates generally to the field of electrical engineering.

BACKGROUND

Many electronic devices in use today are powered by a battery system. Such systems often provide a battery compartment that provides space for multiple batteries to be inserted into individual slots. When each slot contains a battery, the battery system completes an electrical circuit that allows the device to be powered. However, many devices fail to power properly when one or more of the battery slots are empty or contains a battery with insufficient power, rendering the device unusable.

SUMMARY

A battery compartment can include a primary battery slot, at least one optional intermediate battery slot, a terminal battery slot, and a bypass switch. More specifically, the primary battery slot can retain a first battery and can have primary positive and negative leads oriented to contact corresponding positive and negative terminals of the first battery. The optional intermediate battery slot can retain a second battery and can have intermediate positive and negative leads oriented to contact positive and negative terminals of the second battery. The terminal battery slot can retain a third battery and can have terminal positive and negative leads oriented to contact positive and negative terminals of the third battery. The battery slots can be connected in series with the intermediate battery slot oriented between the primary and terminal slots. At least one bypass switch can be coupled to one or both of the leads of at least one of the battery slots. The switch can also be adapted to create an electrical path to a subsequent battery slot when the battery slot corresponding to the switch is empty. In this manner, a complete circuit can provide electrical power to an associated device without filling all available battery slots.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
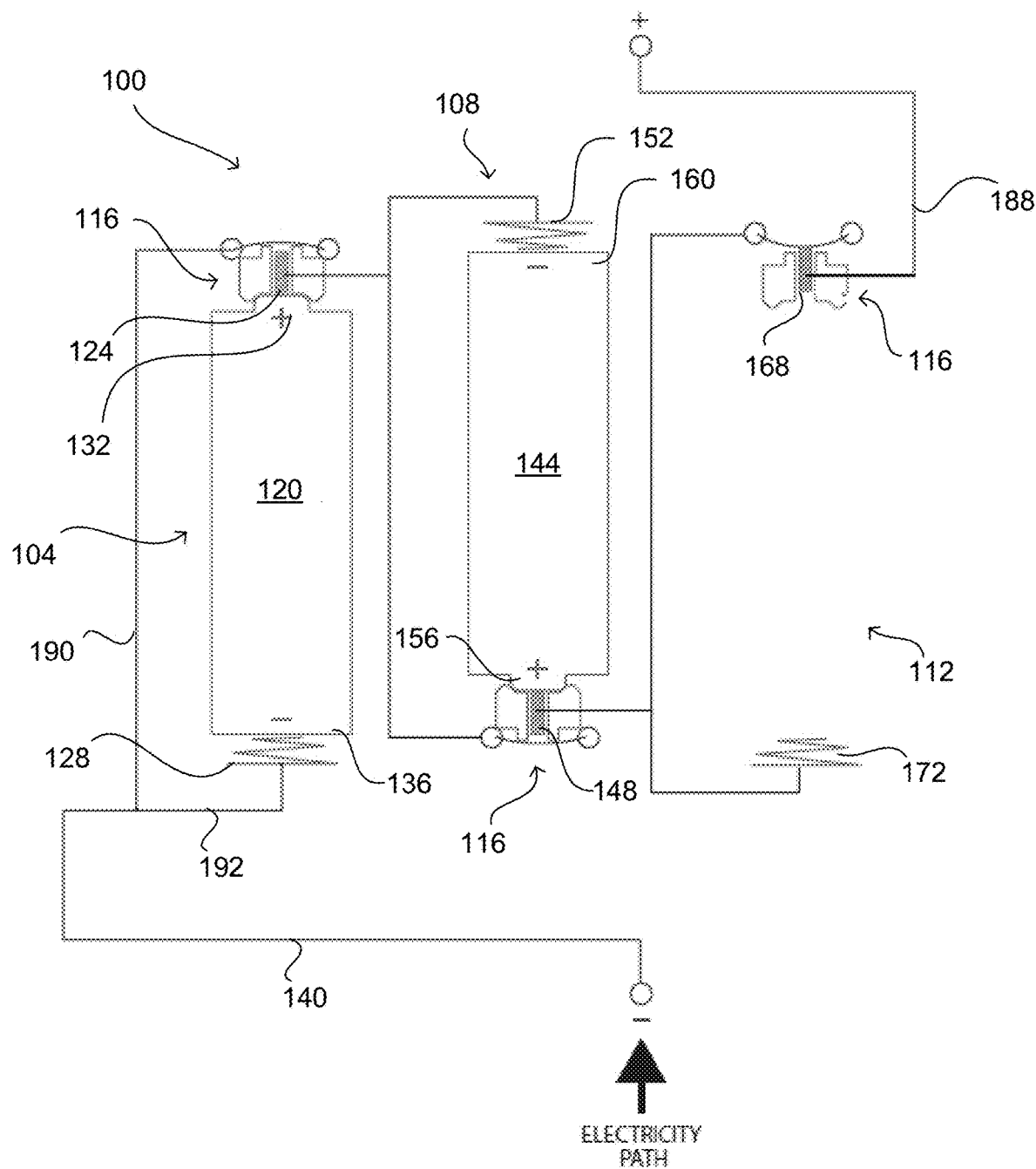
FIG. 1 is a schematic view of a battery compartment where a bypass switch is coupled to the terminal positive lead in accordance with one example of the invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a terminal" includes reference to one or more of such features and reference to "contacting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of" For example, "at least one of A, B and C" explicitly includes only A, only B, only C, and combinations of each (e.g. A+B, B+C, A+C, and A+B+C).

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Variable Battery System for Flashlights

Referring generally to FIG. 1 a battery compartment 100 can include a primary battery slot 104, at least one optional intermediate battery slot 108, a terminal battery slot 112, and a bypass switch 116. More specifically, the primary battery slot can be adapted to retain a first battery 120. The primary battery slot can also have a primary positive lead 124 and a primary negative lead 128 oriented to contact corresponding positive and negative terminals 132, 136 of the first battery 120. The primary negative lead can create an electrical path to a negative device lead 140 as seen in FIG. 1. Although a bypass switch is illustrated at each positive terminal location, this is not required. For example, one or more of the battery slots can be standard battery slots, as long as at least one battery slot includes a corresponding bypass switch. In one example, each battery slot includes a corresponding bypass switch.

The optional at least one intermediate battery slot 108 can be adapted to retain a second battery 144. The intermediate slot can also have an intermediate positive lead 148 and an intermediate negative lead 152 oriented to contact positive and negative terminals 156, 160 of the second battery 144.

As seen in FIG. 1 the intermediate battery slot 108 can be oriented between the primary battery slot 104 and the terminal battery slot 112. The battery compartment can also contain additional intermediate battery slots, such as a second intermediate battery slot, a third intermediate battery slot, and so forth adapted to retain additional batteries as desired for a particular electronic device.

The terminal battery slot 112 can be adapted to retain a third battery (not shown). However, where multiple intermediate battery slots are used, the terminal battery slot can retain a fourth battery, a fifth battery, etc. For example, when the battery compartment contains two intermediate battery slots, the terminal battery slot retains a fourth battery. The terminal slot can also have terminal positive lead 168 and a terminal negative lead 172 oriented to contact positive and negative terminals of a corresponding terminal battery. The terminal positive lead 168 can create an electrical path to a positive device lead 188 as illustrated.

In general, the primary battery slot 104, optional intermediate battery slots 108, and terminal battery slot 112 can be connected in series as seen in FIG. 1. In such a case, the negative lead of a battery slot, if not connecting to a negative device lead 140, creates an electrical path to the positive lead of a previous battery slot, though it may also create a path to the negative lead of the previous slot when the battery slot is vacant, as will be discussed below. Likewise, the positive lead of a battery slot, if not connecting to a positive device lead 188, creates an electrical path to the negative lead of a subsequent battery slot, though it may also create a path to the positive lead of the subsequent slot. For any particular battery slot, the orientation of the positive and negative leads of that slot can be spatially aligned or opposite the orientation of the positive and negative leads of the previous or subsequent battery slot. Thus, for example, when primary slot 104 is vacant bypass switch 116 is engaged to direct current along bypass leg 190. In contrast, when a battery is appropriately oriented within primary slot 104, current is directed along primary supply leg 192 and through the first battery 120.

Battery slot leads can be made from any conductive material and in any form suitable for creating a sufficient electrical contact with the terminals of a corresponding battery. For example, the leads can be made from a conductive metal, such as copper, aluminum, gold, or any combination of such metals suitable for conductivity. Likewise, the leads can take the form of a coiled spring wire, a flat tab, or any other form that contacts a battery terminal to create a sufficient electrical contact to allow electrical current.

Each of the primary, intermediate, and terminal battery slots 104, 108, 112 can be sized to receive the same sized battery, such as a AAA sized battery. It is also contemplated that each battery slot can be adapted to hold a predetermined size of battery or it can be adapted to hold one of several different sizes of batteries. For example, each battery slot can be sized and shaped to only hold one AA battery. Or the slot can be sized and shaped to hold any one of a AA battery, a AAA battery, C battery, D battery, one or more button cell batteries, and the like. In some cases, the battery compartment can include mixed battery sizes depending on the corresponding electronic device and design amperage and current requirements.

Figure 2:
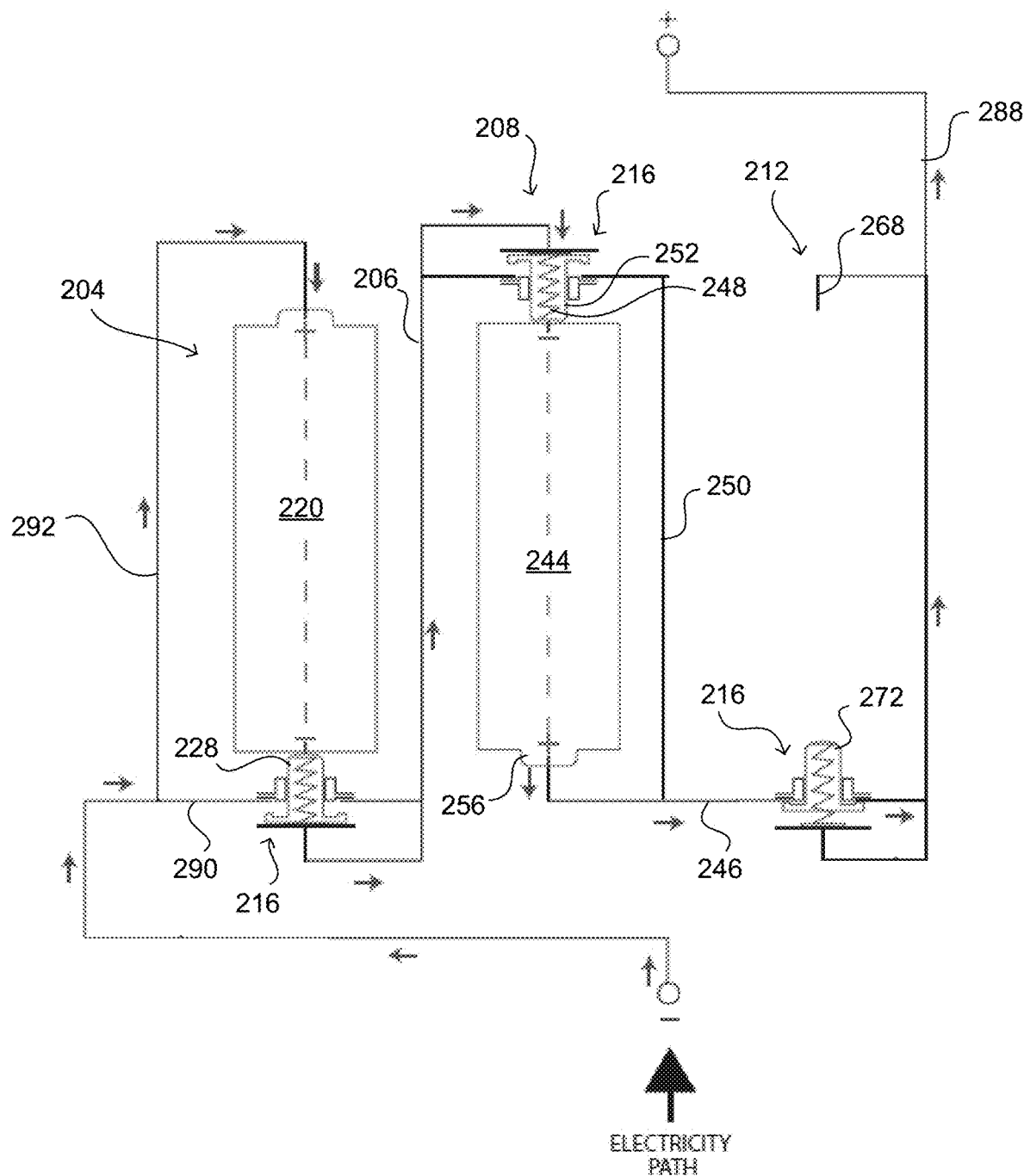
FIG. 2 is a schematic view of a battery compartment containing two intermediate battery slots oriented between the primary and terminal battery slots in accordance with another example of the invention.

At least one bypass switch can be coupled to one or both of the leads of at least one of the battery slots. FIG. 2 illustrates an example of the invention wherein a bypass switch is coupled to a battery slot's negative leads. In this case, the bypass switch 216 is coupled to the negative lead 228 of the primary battery slot 204. When a primary battery 220 is in place the bypass switch 216 is in an engaged position such that current flows through primary supply leg 292 across the primary battery and along intermediate supply leg 206 to intermediate battery slot 208. In contrast, when the primary battery slot 204 is vacant, bypass switch 216 is in a bypass position (not shown) such that current flows along bypass leg 290 and into intermediate supply leg 206.

Similarly, an intermediate bypass switch 216 can be oriented at intermediate battery slot 208. In this case, when an intermediate battery 244 is in place, the intermediate bypass switch 216 is in an engaged position such that current flows into intermediate negative lead 248, through the intermediate battery 244, and into terminal supply leg 246. When intermediate battery slot 208 is vacant, intermediate bypass switch 216 is in a bypass position (not shown), such that current flows along intermediate bypass leg 250 and through terminal supply leg 246 to terminal battery slot 212.

The terminal battery slot 112 includes a terminal positive lead 268 and a terminal negative lead 272. As with other battery slots, when the terminal battery slot 112 is vacant, a terminal bypass switch 216 is in a bypass position which allows current to flow from the terminal supply leg 246 through the terminal bypass switch 216 and into the positive device lead 288. Thus, in the illustrated configuration, each battery compartment includes a negative lead of a battery slot which is coupled to a bypass switch 216 and creates an electrical path to the bypass switch of a subsequent battery slot or to a device lead. As seen in FIG. 4, the primary bypass switch 216 coupled to the negative lead 228 of the primary battery slot 204 creates an electrical path directly to the intermediate bypass switch 216 coupled to the negative lead 248 of the intermediate battery slot 208, when the primary battery slot 204 is empty.

As discussed above, a bypass switch can be adapted to create an electrical path to a subsequent battery slot when the battery slot corresponding to the switch is empty. Accordingly, there are various contemplated configurations of bypass switches and battery slots to meet such a purpose. For example, at least one bypass switch can be coupled to one or both of the leads of at least one of the battery slots. Specifically, a bypass switch may be coupled to only the positive lead of the terminal battery slot, or it may be coupled to the positive leads of several battery slots. Thus, one example of the invention is contemplated where only the positive lead of the terminal battery slot is coupled to a bypass switch. In such an example, the device would still be powered if the terminal battery slot were empty. In another example of the invention, the battery compartment includes a primary battery slot, two intermediate battery slots, and a terminal battery slot, each including a corresponding bypass switch. In this manner, as long as at least one battery slot includes a functioning battery, the device can be powered.

Figure 3A:
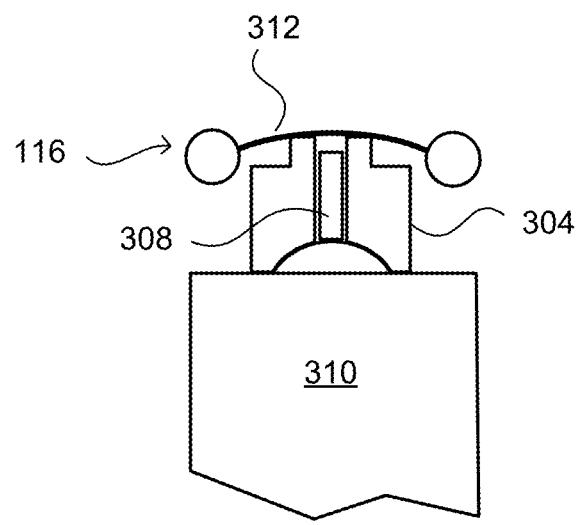
FIG. 3A is a schematic view of a bypass switch oriented at a positive terminal with the bypass switch in an engaged position in accordance with one example of the invention.
Figure 3B:
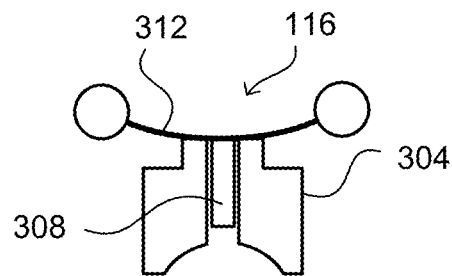
FIG. 3B is a schematic view of the bypass switch of FIG. 3A with the battery slot empty and the bypass switch in a bypass position.

The bypass switch can be provided in any suitable configuration which enables an engaged position when a battery is in place and a bypass position when a corresponding battery slot is vacant. For example, FIGS. 3A and 3B illustrate a bypass switch 116 similar to the one in FIG. 1. The bypass switch can include a moveable cuff 304, a center pin contact 308, and a contact spring 312. Specifically, the moveable cuff 304 can have a bypass position (FIG. 3B) and an engaged position (FIG. 3A). As seen in FIG. 3A, the cuff 304 is in the engaged position when a battery 310 has been placed in the corresponding slot. In this case, the positive lead pushes the moveable cuff 304 upward sufficient to deflect the contact spring 312 out of contact with the center pin contact 308. The center pin contact 308 can be connected to a subsequent battery slot or device lead as previously described.

In contrast, when a battery slot is empty as shown in FIG. 3B, the corresponding bypass switch 116 will be in the bypass position. In the bypass position, the moveable cuff 304 is moved down by the contact spring 312 until the spring contacts the center pin contact 308. Notably, each of the contact spring 312 and the center pin contact 308 can be formed of a conductive material, e.g. stainless steel, copper, etc. In contrast, the movable cuff 304 can be formed of a non-conductive material, e.g. plastic, composite, etc. When the moveable cuff 304 transitions from the bypass position to the engaged position, or vice versa, the center contact pin 308 does not necessarily move, and can in some cases be fixed in position relative to the battery compartment. While in the bypass position, the bypass switch 116 forms an electrical path from the positive lead of the corresponding battery slot to both the negative lead and the bypass switch of a subsequent battery slot.

Figure 4A:
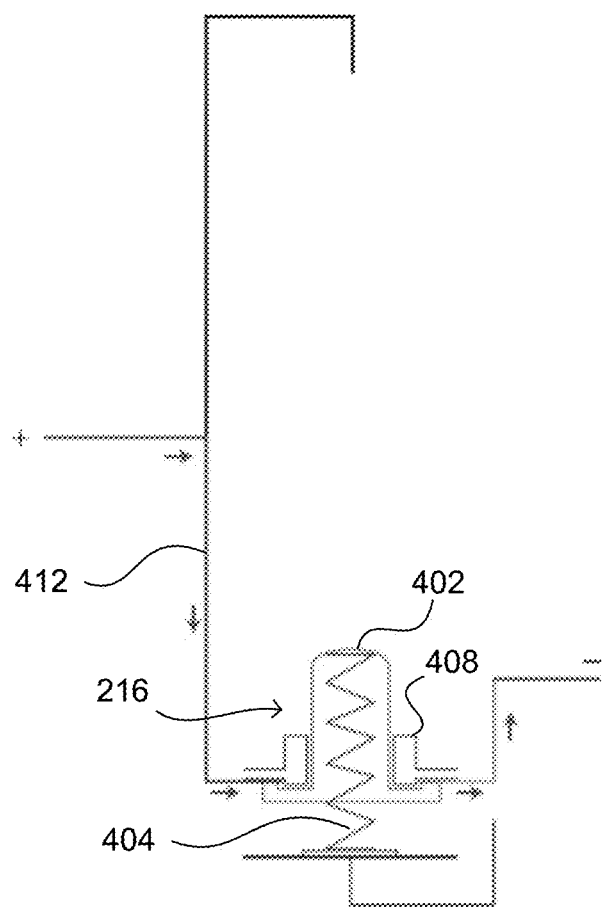
FIG. 4A is a schematic view of a bypass switch oriented at a negative terminal with the bypass switch in a bypass position and showing the primary battery slot as empty in accordance with another example of the invention.
Figure 4B:
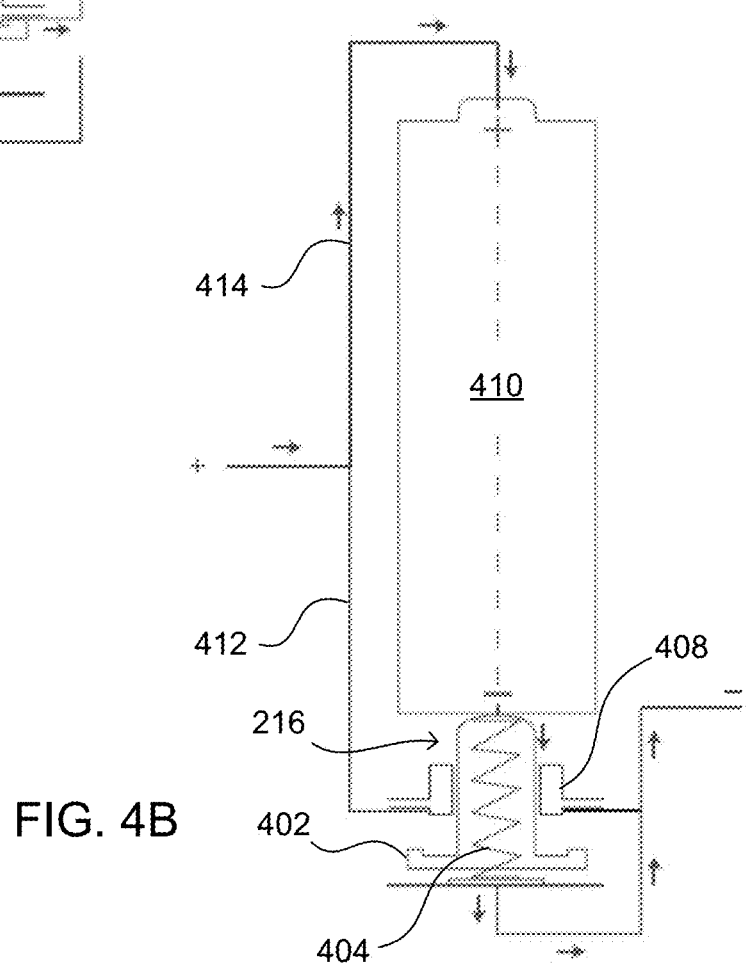
FIG. 4B is a schematic view of the bypass switch of FIG. 4A with the battery slot occupied and the bypass switch in an engaged position.

FIGS. 4A and 4B illustrate another example of a bypass switch 216 in a bypass position (FIG. 4A) and an engaged position (FIG. 4B). In this case, the bypass switch 216 includes a flanged peg 402, a bias spring 404, and a contact support 408. The flanged peg 402 can be slidably engaged within the contact support 408 such that the contact support includes contacts on a peripheral surface which connect with the flanged portion of the flanged peg to create a current path along a bypass leg 412 across the peg when in the bypass position. In contrast, as illustrated in FIG. 4B, when a battery 410 is oriented within the battery slot, the bypass switch 216 is in an engaged position. In the engaged position, the flanged peg 402 is pushed away from the contact support so as to disconnect the bypass switch. Accordingly, current flows along a supply leg 414 and across the battery 410. Current is then directed through the flanged peg and to a subsequent battery slot or device.

Figure 5A:
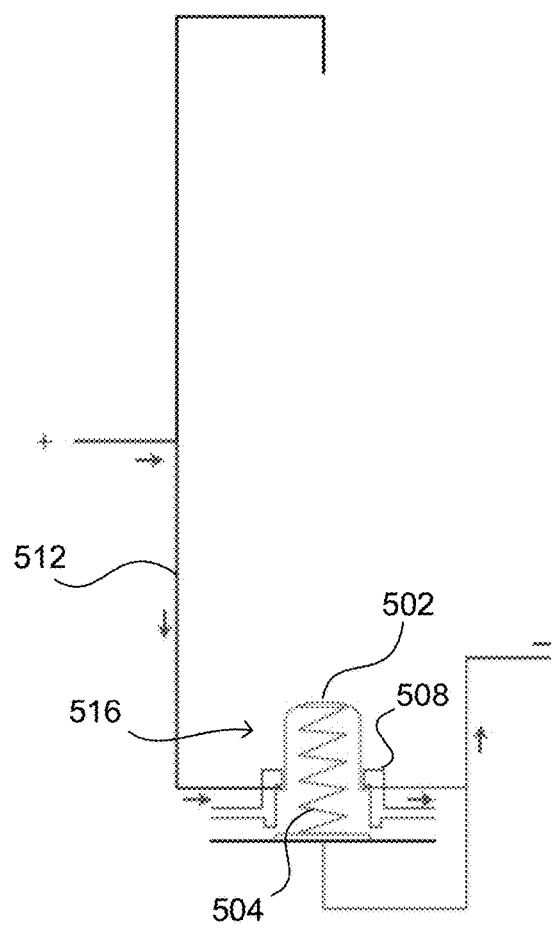
FIG. 5A is a close-up view of one example of the bypass switch in an engaged position in accordance with one example of the present invention.
Figure 5B:
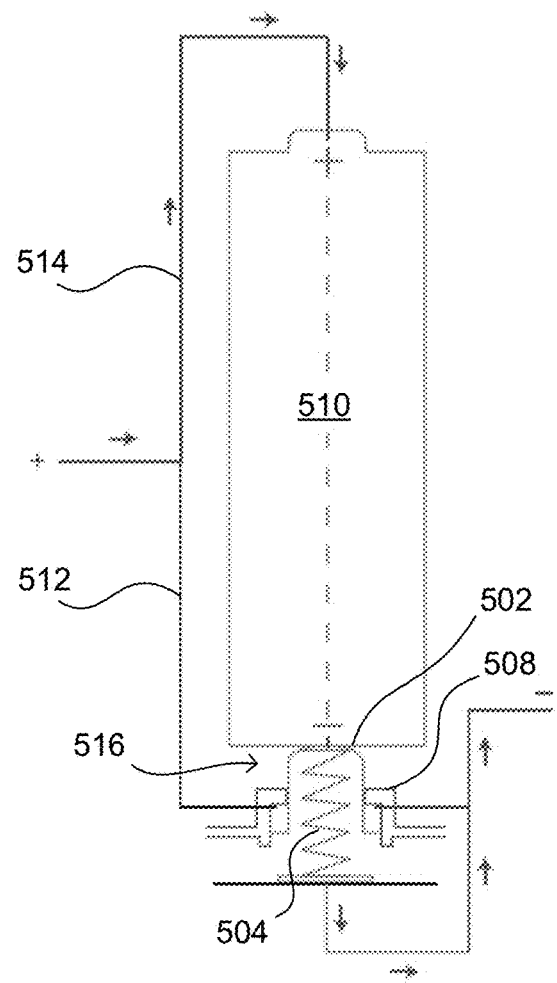
FIG. 5B is a close-up view of FIG. 5A where the bypass switch is in a bypass position.

FIGS. 5A and 5B illustrate another example of a bypass switch 516 in a bypass position (FIG. 5A) and an engaged position (FIG. 5B). In this case, the bypass switch 516 includes a flanged peg 502, a bias spring 504, and a contact support 508. The flanged peg 502 can be slidably engaged within the contact support 508 such that the contact support includes contacts on an inner surface which connect with the flanged portion of the flanged peg to create a current path along a bypass leg 512 across the peg when in the bypass position. Thus, in this example, the flanges of the flanged peg 502 are maintained within the corresponding contact support 508 at each position. As illustrated in FIG. 5B, when a battery 510 is oriented within the battery slot, the bypass switch 516 is in an engaged position. In the engaged position, the flanged peg 502 is pushed away from the contact support so as to disconnect the bypass switch. Accordingly, current flows along a supply leg 514 and across the battery 510. Current is then directed through the flanged peg and to a subsequent battery slot or device. The contact support can include an annular body through which a body and tip portion of the flanged peg pass through and the flanged portion does not pass through the annular body. The annular body can also have a conductive pad which is oriented to contact the flanged portion to complete a bypass connection.

In these examples, the bias spring orients the peg to the bypass position when the corresponding battery slot is empty. While in the bypass position, the flanged peg contacts the conductive contacts forming an electrical path from the corresponding lead to a subsequent battery slot.

The battery compartments described herein can be used with corresponding electronic devices. Non-limiting examples of suitable electronic devices can include flashlights, floodlights, headlamps, work lights, radios, handheld equipment, children's toys, and the like. Power requirements for corresponding electronic devices can be accommodated by considering the potential battery slot segments, bypass switch locations, parallel-series arrangement, and the like according to well known principles. As a result, the battery compartment offers improved options for users with fewer batteries than a total maximum battery capacity for a particular device. For example, a user may insert only a single available AA battery for a flashlight having three AA slots.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A battery compartment, comprising:
   a) a primary battery slot adapted to retain a first battery, and having a primary positive lead and a primary negative lead oriented to contact corresponding positive and negative terminals of the first battery;
   b) optionally at least one intermediate battery slot adapted to retain a second battery, and having an intermediate positive lead and an intermediate negative lead oriented to contact corresponding positive and negative terminals of the second battery;
   c) a terminal battery slot adapted to retain a third battery, and having a terminal positive lead and a terminal negative lead oriented to contact corresponding positive and negative terminals of the third battery, wherein each of the primary battery slot, optional intermediate battery slot, and terminal battery slot is connected in series with the optional at least one intermediate battery slot oriented between the primary battery slot and the terminal battery slot, and
   d) at least one bypass switch coupled to one or both of the negative and the positive lead of at least one of the battery slots and entirely at a top end or a bottom end of the at least one of the battery slots and adapted to create an electrical path to a subsequent battery slot when the battery slot is empty, wherein the electrical path is in a series electrical arrangement, wherein the bypass switch comprises a center pin contact surrounded by a moveable cuff that is moveable independent of the center pin contact, and the center contact pin is conductive, the moveable cuff having a bypass position and an engaged position, wherein the bypass switch further includes a contact spring configured to contact the center pin contact when the moveable cuff is in the bypass position.

2. The battery compartment of claim 1, wherein the bypass switch is coupled to the positive lead of one or more of the primary battery slot or the intermediate battery slot.

3. The battery compartment of claim 2, wherein the bypass position of the moveable cuff forms an electrical path from the positive terminal of the battery to the negative lead of a subsequent battery slot and to the bypass switch of the subsequent battery slot.

4. The battery compartment of claim 3, wherein the center pin contact is configured to contact the positive terminal of a battery in the engaged position.

5. The battery compartment of claim 1, wherein the bypass switch is coupled to the negative lead of one or more of the primary battery slot or the intermediate battery slot.

6. The battery compartment of claim 5, wherein the bypass switch includes a flanged peg having a bypass position and an engaged position, wherein the bypass position forms an electrical path from the negative lead to a positive lead of a subsequent battery slot and to a bypass switch of the subsequent battery slot.

7. The battery compartment of claim 6, wherein the flanged peg is coupled to a bias spring configured to orient the flanged peg to the bypass position when the battery slot is empty.

8. The battery compartment of claim 1, wherein all battery slots are sized to receive the same sized battery.

9. The battery compartment of claim 1, wherein the terminal battery slot has a bypass switch coupled to one or both of the positive and negative leads and the primary battery slot and optional intermediate battery slots have no bypass switch.

10. The battery compartment of claim 1, wherein a first intermediate battery slot is followed by a second intermediate battery slot, wherein the two intermediate slots are oriented between the primary battery slot and the terminal battery slot.

11. The battery compartment of claim 10, wherein the first intermediate battery slot, the second intermediate battery slot, and the terminal battery slot each have a bypass switch coupled to one or both of the positive and negative leads.

12. The battery compartment of claim 1, wherein an orientation of the positive and negative leads of a battery slot are opposite an orientation of the positive and negative leads of a previous battery slot.

13. The battery compartment of claim 1, wherein the primary negative lead creates an electrical path to a negative device lead and the terminal positive lead creates an electrical path to a positive device lead.

14. The battery compartment of claim 1, wherein each of the primary, terminal, and optional intermediate battery slots are sized to hold at least one of several different sized batteries.

15. The battery compartment of claim 4, wherein the center pin contact is connected to a subsequent battery slot, negative device lead or positive device lead.

16. The battery compartment of claim 1, wherein the contact spring comprises a conductive arc structure in contact with the center pin contact.

17. The battery compartment of claim 1, wherein the contact spring is configured to move the moveable cuff in a downward position to make contact with the center pin contact.

18. The battery compartment of claim 1, wherein the moveable cuff is comprised of a non-conductive material.

* * * * *